(12) United States Patent
Lepek

(10) Patent No.: US 8,718,545 B2
(45) Date of Patent: May 6, 2014

(54) TRANSPONDER AND METHOD FOR OPERATING A TRANSPONDER

(75) Inventor: Paul Lepek, Langebrueck (DE)

(73) Assignee: Atmel Corporation, San Jose, CA (US)

( * ) Notice: Subject to any disclaimer, the term of this patent is extended or adjusted under 35 U.S.C. 154(b) by 762 days.

(21) Appl. No.: 12/138,162

(22) Filed: Jun. 12, 2008

(65) Prior Publication Data

US 2008/0311861 A1    Dec. 18, 2008

Related U.S. Application Data

(60) Provisional application No. 60/944,081, filed on Jun. 14, 2007.

(30) Foreign Application Priority Data

Jun. 12, 2007   (DE) .......................... 10 2007 027 610

(51) Int. Cl.
*H04B 5/00*       (2006.01)
(52) U.S. Cl.
USPC .......... 455/41.1; 455/423; 455/425; 455/572; 455/573; 340/10.1; 340/10.34; 340/635; 340/636.15; 340/636.19; 340/636.2
(58) Field of Classification Search
USPC ............. 455/423, 425, 41.1, 67.11, 572, 573; 340/10.1, 10.34, 10.5, 572.1, 635, 340/636.15, 636.19, 636.2
See application file for complete search history.

(56) References Cited

U.S. PATENT DOCUMENTS

| | | | |
|---|---|---|---|
| 5,073,781 A * | 12/1991 | Stickelbrocks | ................. 342/51 |
| 5,339,073 A | 8/1994 | Dodd et al. | |
| 5,345,231 A | 9/1994 | Koo et al. | |
| 5,608,406 A * | 3/1997 | Eberth et al. | .................... 342/51 |
| 5,621,412 A | 4/1997 | Sharpe et al. | |

(Continued)

FOREIGN PATENT DOCUMENTS

| | | |
|---|---|---|
| DE | 698 31 711 T2 | 6/2006 |
| DE | 603 08 113 T2 | 1/2007 |

(Continued)

OTHER PUBLICATIONS

European Patent Office Communication, extended search report re: Application No./Patent No. 08010591.9-1248/20030603; reference 1183 EP1 (2 pages).

(Continued)

*Primary Examiner* — Tuan A Tran
(74) *Attorney, Agent, or Firm* — Baker Botts L.L.P.

(57) ABSTRACT

A transponder and method for operating a transponder, which has a capacitor ($C_{buf}$) for storing power transmitted via an air interface and an arithmetic logic unit (10) that can be supplied with the stored power, in which a capacitor voltage ($V_C$) of the capacitor ($C_{buf}$) is compared with a first threshold ($V_1$), in which the capacitor voltage ($V_C$) is compared with a second threshold ($V_2$), whereby the first threshold ($V_1$) and the second threshold ($V_2$) are different, in which in a first operating mode (M1), when the capacitor voltage ($V_C$) is above the first threshold ($V_1$), the arithmetic logic unit (10) performs a number of routines with a different priority, in which in a second operating mode (M2), when the capacitor voltage ($V_C$) is between the first threshold ($V_1$) and the second threshold ($V_2$), a number of low-priority routines are stopped and a number of high-priority routines are continued.

14 Claims, 3 Drawing Sheets

(56) References Cited

U.S. PATENT DOCUMENTS

| | | | |
|---|---|---|---|
| 5,945,920 A | 8/1999 | Maletsky | |
| 6,091,342 A | 7/2000 | Janesch et al. | |
| 6,462,647 B1 * | 10/2002 | Roz | 340/10.1 |
| 7,088,246 B2 | 8/2006 | Fukuoka | |
| 7,680,975 B2 * | 3/2010 | Tanigawa | 711/103 |
| 2001/0052548 A1 | 12/2001 | Thueringer | |

FOREIGN PATENT DOCUMENTS

| | | |
|---|---|---|
| EP | 0 473 569 A2 | 9/1994 |
| EP | 1109128 A1 | 6/2001 |
| EP | 1 793 331 | 6/2007 |
| WO | WO 03/041009 | 5/2003 |

OTHER PUBLICATIONS

European Patent Office Search Report re EP 2 003 603 A3 dated Nov. 30, 2009 (3 pages).

* cited by examiner

TRANSPONDER AND METHOD FOR OPERATING A TRANSPONDER

This nonprovisional application claims priority to German Patent Application No. DE 102007027610, which was filed in Germany on Jun. 12, 2007, and to U.S. Provisional Application No. 60/944,081, which was filed on Jun. 14, 2007, and which are both herein incorporated by reference.

The present invention relates to a transponder and a method for operating a transponder, as well as to a use for a transponder.

German patent publication DE 698 31 711 T2 shows a transponder communication device, which is configured for contactless communication with a transponder present within a reception range of the transponder communication device. Furthermore, German patent publication DE 698 31 711 T2 shows a transponder, which is configured for contactless communication with at least one transponder communication device and which is activated in an active state to communicate with a transponder communication device.

This type of transponder communication device with a transponder is also disclosed in U.S. Pat. No. 5,339,073. U.S. Pat. No. 5,339,073 discloses an access control equipment, which contains an interrogation unit, which emits an interrogation signal, as well as a plurality of transponders, whereby each transponder has a stored identity code different from that of the other transponders. This identity code contains a plurality of fields, each of which holds a selected information bit. The interrogation signal is controlled so that the fields of all transponders within range are interrogated simultaneously in a serial manner. A group reply signal is sent back to the interrogation unit by any transponder which has, in the interrogated field, a bit matching required by the interrogation signal. The interrogation unit is arranged to determine, from the series of received reply signals, the identity of each and every valid transponder within range.

Another exemplary document is U.S. Pat. No. 5,345,231, whereby for the case when there are several transponders in the reception range of a known transponder communication device, the problem arises of the individual selection of each and every known transponder. This individual selection can be performed with use of selection means of a transponder communication device.

U.S. Pat. No. 5,621,412 discloses a system and a method in which energy is conserved during transponder operation. In this case, the transponder is activated or awakened in multiple stages. A threshold detector measures the power level of the received RF energy. If the RF energy exceeds a predetermined threshold, the transponder employs the modulation detector to ascertain whether it was awakened by a valid signal or by a random sudden change in amplitude (burst). If a predetermined modulation has been detected, the transponder is fully activated to its normal operational state.

A method for transmitting data between a base station and a passive transponder is known from European Patent Application EP 473 569 B1. In this case, digital data are exchanged between a base station and a passive transponder by means of an amplitude modulated carrier wave.

The object of the invention is to provide a method which improves the power supply to a transponder as much as possible.

This object is achieved by a method with the features of independent claim 1. Advantageous refinements are the subject of dependent claims.

Accordingly, a method for operating a transponder is provided. The transponder has a capacitor for storing power transmitted via an air interface and an arithmetic logic unit that can be supplied with the stored power. If the transponder is supplied with power transmitted via an air interface, this type of transponder is also called a passive transponder. In addition, the transponder can have its own power supply, such as, for example, a chargeable or nonchargeable battery.

In the method, a capacitor voltage of the capacitor is compared with a first threshold. A comparator can be used, for example, for the comparison. For this purpose, for example, the voltage of the capacitor is sampled and analog-to-digital converted. Alternatively, an analog comparator may also be employed which enables a continuous comparison. Furthermore, the capacitor voltage is compared with the second threshold, whereby the first threshold and the second threshold are different. A comparator, for example, can be employed for the comparison of the capacitor voltage with the second threshold. The comparison with the first threshold and with the second threshold can occur disjunctive in time but preferably simultaneously.

Preferably, the arithmetic logic unit in a first operating mode performs a number of routines with a different priority. The first operating mode is thereby defined when the capacitor voltage is above the first threshold. In this case, capacitor voltage is taken to mean the absolute value, so that it is immaterial whether the capacitor voltage is regarded as a positive or negative voltage. The operating mode is preferably established by the arithmetic logic unit by setting, for example, certain values or parameters.

The operating mode preferably depends on the capacitor voltage detected advantageously by a comparator. Preferably, a coded signal or a signal assigned for detection is transmitted to the arithmetic logic unit. The signal is, for example, a detection status flag or an interrupt signal (IRQ, interrupt request). Advantageously, a status register, programmed within the arithmetic logic unit, is updated according to the detection within a software program. In this way, tracking of the operating mode and control of functionalities of the arithmetic logic unit or the transponder are advantageously made possible.

Preferably, in a second operating mode a number of routines with a low priority are stopped and a number of routines with a high priority are continued. This occurs under the condition that the capacitor voltage is between the first threshold and the second threshold. Preferably, the routines, for example, interrupt routines (IRQ), assigned to the second threshold, have a higher priority than routines assigned to the first threshold. Higher-priority routines can preallocate, for example, interruptions of the program run, which are otherwise assigned to lower-priority routines.

According to an advantageous refinement, suspension of the routines of the arithmetic logic unit occurs in a third operating mode. The suspension occurs under the condition that the capacitor voltage is below the second threshold. In this case, register values of routines are stored, for example, in a nonvolatile memory (EEPROM, FRAM, etc.) and the values can be reloaded into the register after the suspension.

A preferred refinement provides that at least the previously suspended routines are continued, when the capacitor voltage is again above the first threshold or even above the second threshold. If the arithmetic logic unit is reset, first an initialization is started and then the routines are run from their beginning. In contrast, the suspended routines can be continued at any place within their run. Preferably, at least one of the suspended routines is continued at a place within its run at which it was previously suspended. Alternatively, returns within the run of the specific routine are also possible. To continue the routine, said routine therefore is not restarted or initialized.

It is provided in another refinement that falling below and/or exceeding the first threshold by the capacitor voltage triggers a first interrupt signal (interrupt request) to interrupt the program run in the arithmetic logic unit. For this purpose, the interrupt signal reaches an interrupt-capable input of the arithmetic logic unit. The interrupt signal is generated, for example, as a rising edge of a digital signal. It is provided in yet another refinement that falling below and/or exceeding the second threshold by the capacitor voltage triggers a second interrupt signal to interrupt the program run in the arithmetic logic unit.

The object of the invention is furthermore to provide a use for a transponder whose power supply is improved as much as possible.

This object is achieved by a use with the features of independent claim 6. The use can be refined advantageously by the features of the method or the transponder.

Accordingly, a use of a first threshold and a second threshold, different from the first threshold, is provided to monitor a capacitor voltage of a capacitor of a transponder. In addition to the capacitor, the transponder has an arithmetic logic unit, which can be supplied with power stored in the capacitor. Preferably, the arithmetic logic unit is configured to reduce the current uptake, when the capacitor voltage is between the first threshold and the second threshold.

Preferably, the arithmetic logic unit operates in a first operating mode, when the capacitor voltage is above the first threshold. The first operating mode can also be called the normal mode (normal level). In the first operating mode, the functionality of the arithmetic logic unit and/or the transponder is not limited.

Preferably, the arithmetic logic unit operates in a second operating mode, when the capacitor voltage is below the first threshold and above a second threshold. The second operating mode can also be called the warning mode (warning level). Advantageously, at least a limitation of a current drain from the capacitor is activated in the second operating mode. Advantageously, at least a functionality of the transponder is deactivated in the second operating mode to reduce the current drain from the capacitor. Preferably, a firmware periodically reads a status register which is programmed within the arithmetic logic unit and contains the operating mode. Advantageously, depending on a value of the status register, peripheral circuits in the transponder are activated or deactivated and a clock frequency of the arithmetic logic unit is changed.

Preferably, the arithmetic logic unit operates in a third operating mode, when the capacitor voltage is below the second threshold. The third operating mode can also be called the emergency operating mode (stop level). Advantageously, in the third operating mode the predominant part of the functionality of the transponder is deactivated. Only a low charge remains in the capacitor. The arithmetic logic unit advantageously switches to a sleep state. For this purpose, the routines of the arithmetic logic unit are preferably suspended. The suspended routines are continued by a return at any place within its run, for example, at the suspended place or another place, when the capacitor voltage is at least above the second threshold.

A third threshold is preferably provided in addition below the second threshold. Preferably, the arithmetic logic unit is reset, when the capacitor voltage falls below the third threshold (reset level). For example, in the third operating mode despite the deactivation of the predominant part of the transponder's functionality, the capacitor voltage can decline further due to a very low current drain from the capacitor and fall below the third threshold. Advantageously, a resetting of the arithmetic logic unit then occurs to avoid undefined states. If the capacitor voltage rises again after the resetting, the arithmetic logic unit is first initialized and then all routines are begun again.

The object of the invention furthermore is to provide a transponder whose power supply is improved as much as possible.

This object is achieved by a transponder with the features of independent claim 7. Advantageous refinements are the subject of dependent claims.

Accordingly, a transponder with a transmit-receive circuit, with a capacitor, with an arithmetic logic unit, and with a comparator circuit is provided. The capacitor is connected to the transmit-receive circuit for charging. The arithmetic logic unit is connected to the capacitor for the power supply. Preferably, the arithmetic logic unit is connected directly or indirectly to the transmit-receive circuit for data transmission.

The comparator circuit is connected to the capacitor. Furthermore, the arithmetic logic unit is connected to the comparator circuit. The comparator circuit is set up to compare a capacitor voltage of the capacitor with a first threshold and with a second threshold different from the first threshold. The capacitor voltage can be applied preferably as an input variable at an input of the comparator circuit.

In an advantageous refinement, the first threshold and/or the second threshold has a hysteresis. Preferably, the comparator circuit has a first window comparator or Schmitt trigger for the first threshold and/or a second window comparator or Schmitt trigger for the second threshold. The hysteresis has a voltage window in regard to the capacitor voltage in which the operating mode is not changed. If, for example, the lower hysteresis for the first threshold is underrun, the arithmetic logic unit changes, for example, from the first operating mode to the second operating mode. If the capacitor voltage increases slightly afterwards, for example, whereby the top hysteresis level of the first threshold is not yet exceeded, the arithmetic logic unit remains in the second operating mode. Only when the top hysteresis level is exceeded by the capacitor voltage does the comparator circuit generate a signal that interrupts, for example, the program run of the arithmetic logic unit, so that the arithmetic logic unit can change back to the first operating mode.

The arithmetic logic unit is preferably set up to perform a number of routines with a different priority within its program run.

According to a preferred refinement, the arithmetic logic unit is set up, depending on an output signal of the comparator circuit, to stop a number of low-priority routines and to continue a number of high-priority routines. Alternatively or in combination, to stop the low-priority routines, in another advantageous refinement, the arithmetic logic unit is set up to disconnect peripheral circuits from the current supply from the capacitor, depending on the output signal of the comparator circuit, or to reduce the frequency of the arithmetic logic unit clock signal.

In an advantageous refinement, the transponder has in addition a battery and a switch. The switch is connected to the battery and to the capacitor to switch the power supply between the battery and capacitor. The battery is chargeable, for example.

Preferably, the arithmetic logic unit is set up to control the switching of the power supply depending on a comparator circuit output signal. Alternatively, another subcircuit of the transponder can also be provided to control the switching.

According to an especially preferred refinement, the first threshold and/or the second threshold of the comparator circuit can be adjusted. The adjustment can be made in this case by a signal over the transmit-receive circuit or by control of the arithmetic logic unit. Preferably, the adjustment of the first and/or second threshold occurs dynamically, for example, as a function of the boundary condition of the transponder. Advantageously, a self-learning adjustment, for example, by means of evaluation by the arithmetic logic unit is also possible.

It is provided in another refinement that the arithmetic logic unit is configured to adjust the first threshold and/or the second threshold and is connected to a control input of the comparator circuit.

Preferably, the comparator circuit has a multiplexer. A first input of the multiplexer is connected to the capacitor and a second input of the multiplexer to a battery, particularly to measure the battery voltage.

The previously described refinement variants are especially advantageous both individually and in combination. In this regard, all refinement variants can be combined with one another also under different claim categories. Some possible combinations are explained in the description of the exemplary embodiments shown in the figures. These possible combinations of the refinement variants, depicted there, are not definitive, however.

In the following text, the invention will be described in greater detail by exemplary embodiments using the graphic drawings.

Here,

Figure 1:
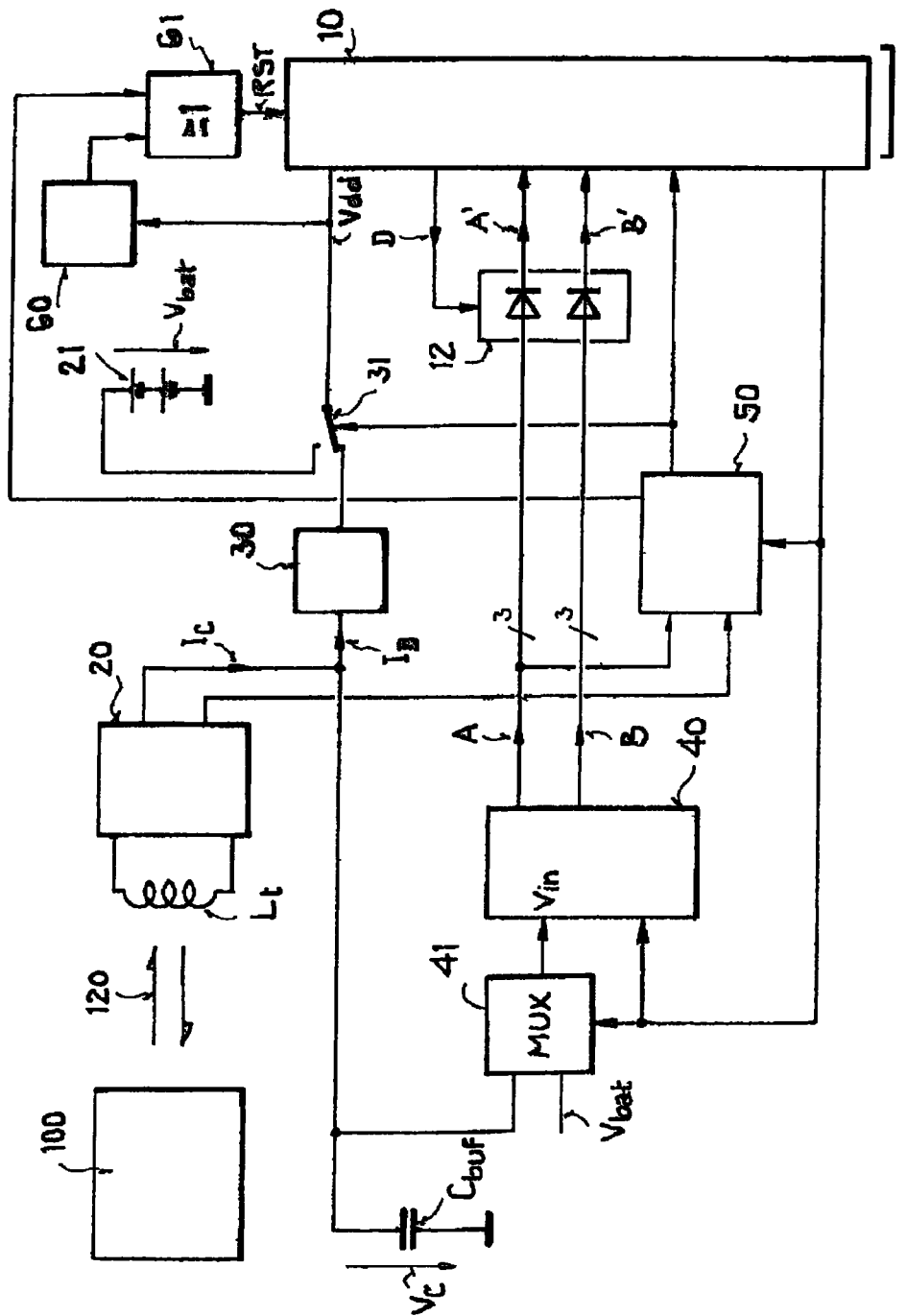
FIG. 1 shows a schematic drawing of a transponder system.

FIG. 1 shows a simplified schematic drawing of a transponder. In addition, a base station 100 is shown which can be connected to the transponder via an air interface. For this purpose, base station 100 transmits an alternating magnetic field 120, which can be received by transmit-receive circuit 20 with a transponder coil $L_t$. The received power of alternating magnetic field 120 is converted to a charging current $I_C$, which charges a capacitor $C_{buf}$. In contrast, capacitor $C_{buf}$ is discharged by discharge current $I_D$. Alternating magnetic field 120 is employed in addition for bidirectional data transmission between the transponder and base station 100.

Discharge current $I_D$ is used to supply an arithmetic logic unit 10 and other subcircuits 12, 20, 30, 31, 40, 41, 50 with electric power. For this purpose, a voltage regulator 30 connected to capacitor $C_{buf}$ is provided, which provides a supply voltage Vdd at its output. To supply arithmetic logic unit 10 as the main current consumer, voltage regulator 30 is connected via a switch 31 to the supply voltage terminal of arithmetic logic unit 10. Arithmetic logic unit 10 is, for example, a computation core of a microcontroller.

If the charging current $I_C$ exceeds the discharge current $I_D$, the capacitor $C_{buf}$ is charged, so that the capacitor voltage $V_C$ increases. If, in contrast, the discharge current $I_D$ exceeds the charging current $I_C$, the capacitor $C_{buf}$ is discharged, so that the capacitor voltage $V_C$ declines. The capacitor voltage $V_C$ thereby depends on the difference between charging current $I_C$ and discharge current $I_D$. If the capacitor voltage $V_C$ is too low, arithmetic logic unit 10 can no longer process the program routines of a program run reliably. The error frequency increases with declining capacitor voltage $V_C$ and can lead to the interruption of the program run and to the resetting of arithmetic logic unit 10. Arithmetic logic unit 10 register values that are not stored are lost upon resetting.

To increase the availability of the arithmetic logic unit in FIG. 1, the transponder has a comparator circuit 40. Comparator circuit 40, for example, has a number of comparators. An input voltage $V_{in}$ of comparator circuit 40 is compared by the comparator circuit with a first threshold and a second threshold. Here, the first threshold and the second threshold are different. The first threshold and the second threshold are adjustable in the exemplary embodiment of FIG. 1. To monitor the capacitor voltage $V_C$, the first threshold and the second threshold are each adjusted in a voltage range of capacitor voltage $V_C$ in which arithmetic logic unit 10 still works reliably. Advantageously, the first threshold and/or the second threshold have a hysteresis to avoid constantly changing states during fluctuation of the capacitor voltage $V_C$ in the range of the particular threshold.

Several operating modes are defined for the arithmetic logic unit 10 of the exemplary embodiment of FIG. 1. The operating modes enable the surprising effect that the current drain during operation of the transponder as a passive transponder can be optimized by selectively activating or deactivating specific transponder functionalities during operation. The activation or deactivation thereby depends on the capacitor voltage $V_C$ of the capacitor $C_{buf}$. One or more operating modes for a reduced current drain for passive transponder applications are used as early indicators and warnings for the software running in arithmetic logic unit 10 about a dangerously low supply voltage Vdd before the capacitor voltage $V_C$ drops below a reset threshold. All values currently determined in arithmetic logic unit 10 are lost during a reset. Resetting of arithmetic logic unit 10 is undesirable, because the resetting of arithmetic logic unit 10 forces initialization routines to restart and to return to the initial state. This in turn requires that base station 100 again transmits an initialization signal to the transponder to begin the data transmission from the beginning.

In the exemplary embodiment of FIG. 1, comparator circuit 40 is connected via a switchable inverter 12 to the inputs of arithmetic logic unit 10, which enable interruption of the program run in arithmetic logic unit 10. The first threshold is thereby assigned output signal A and the second threshold, output signal B. Output signal A is inverted or not inverted by switchable inverter 12 depending on the control signal D.

Output signal B is inverted or not inverted by switchable inverter 12 depending on the control signal D. The switched output signals A' or B' are applied at the inputs of arithmetic logic unit 10. In the exemplary embodiment of FIG. 1, the connections between comparator circuit 40 and arithmetic logic unit 10 are made in triplicate, so that three input signals $V_{in}$ can be monitored in three channels simultaneously with the same or different first and second thresholds.

Furthermore, comparator circuit 40 is connected to at least one output of arithmetic logic unit 10. Comparator circuit 40 is formed with adjustable thresholds, so that at least one threshold can be adjusted by arithmetic logic unit 10 and can be changed particularly during transponder operation.

Comparator circuit 40 can have furthermore a multiplexer 41 to switch several voltages to be monitored to the input $V_{in}$. In the exemplary embodiment of FIG. 1, an input of multiplexer 41 is connected to the capacitor $C_{buf}$ and another input to a battery 21, so that the battery voltage $V_{bat}$ as well can be monitored. In addition, a number of other inputs of multiplexer 41 can be provided. For example, a voltage proportional to the amplitude of the variable magnetic field can be monitored (not shown in FIG. 1). In another embodiment variant (not shown in FIG. 1), battery 21 can be connected to the capacitor $C_{buf}$ to charge battery 21. The connection occurs advantageously depending on the current operating mode. For example, battery 21 is only charged when the capacitor voltage $V_C$ is above the first threshold, because a sufficient power transfer from base station 100 to the transponder is then assured.

Switch 31 of the exemplary embodiment in FIG. 1 is connected to battery 21 and voltage regulator 30 and enables switching between a current supply from capacitor $C_{buf}$ or the charging current $I_C$ and a current supply from the battery $V_{bat}$. Switch 31 is formed, for example, by two field-effect transistors that can be turned on alternately. To control switch 31, a control circuit 50 is provided whose output is connected to switch 31 and to arithmetic logic unit 10 for reading the switching state. Furthermore, inputs of control circuit 50 are connected to arithmetic logic unit 10 and/or to the output of comparator circuit 40.

Another input of control circuit 50 is connected to transmit-receive circuit 20. This makes it possible that transmit-receive circuit 20 switches switch 31, when the transmission is active and the received power is sufficient for running programs in arithmetic logic unit 10. The connection of control circuit 50 to arithmetic logic unit 10 makes it possible that the software of arithmetic logic unit 10 directly controls switch 31 when the operating mode is identified.

Furthermore, control circuit 50 is connected to comparator circuit 40 in such a way that comparator circuit 40 is switched directly between capacitor voltage $V_C$ and battery voltage $V_{bat}$ by means of a signal. This function is activated only when battery voltage $V_{bat}$ is available.

Reset logic 60 is connected via an OR gate 61 to a reset input RST of arithmetic logic unit 10. If the voltage supply Vdd of arithmetic logic unit 10 is too low, so that undefined states can occur, arithmetic logic unit 10 is set back in that reset logic 60 applies a reset signal to the reset input RST of arithmetic logic unit 10 via OR gate 61. Thereafter, arithmetic logic unit 10 is re-initialized and all routines are restarted. The data transmission with base station 100 must also be started over. OR gate 61 is also connected to control circuit 50, so that resetting of arithmetic logic unit 10 can be initiated via an input signal to control circuit 50 by arithmetic logic unit 10 itself and/or by comparator circuit 40 and/or by transmit-receive circuit 20.

The invention is thereby not limited to the shown embodiment of the transponder in FIG. 1. The invention comprises a plurality of different variations. For example, battery 21, voltage regulator 30, switch 31, control circuit 50, inverter 12, OR gate 61, reset logic 60, and/or multiplexer 41 can be omitted. Fixed, nonadjustable thresholds can be used as an alternative to FIG. 1.

The functionality of the transponder circuit according to FIG. 1 can be used especially advantageously for a vehicle key, whereby transmission conditions for the alternating magnetic field 120 vary greatly with time.

Figure 2:
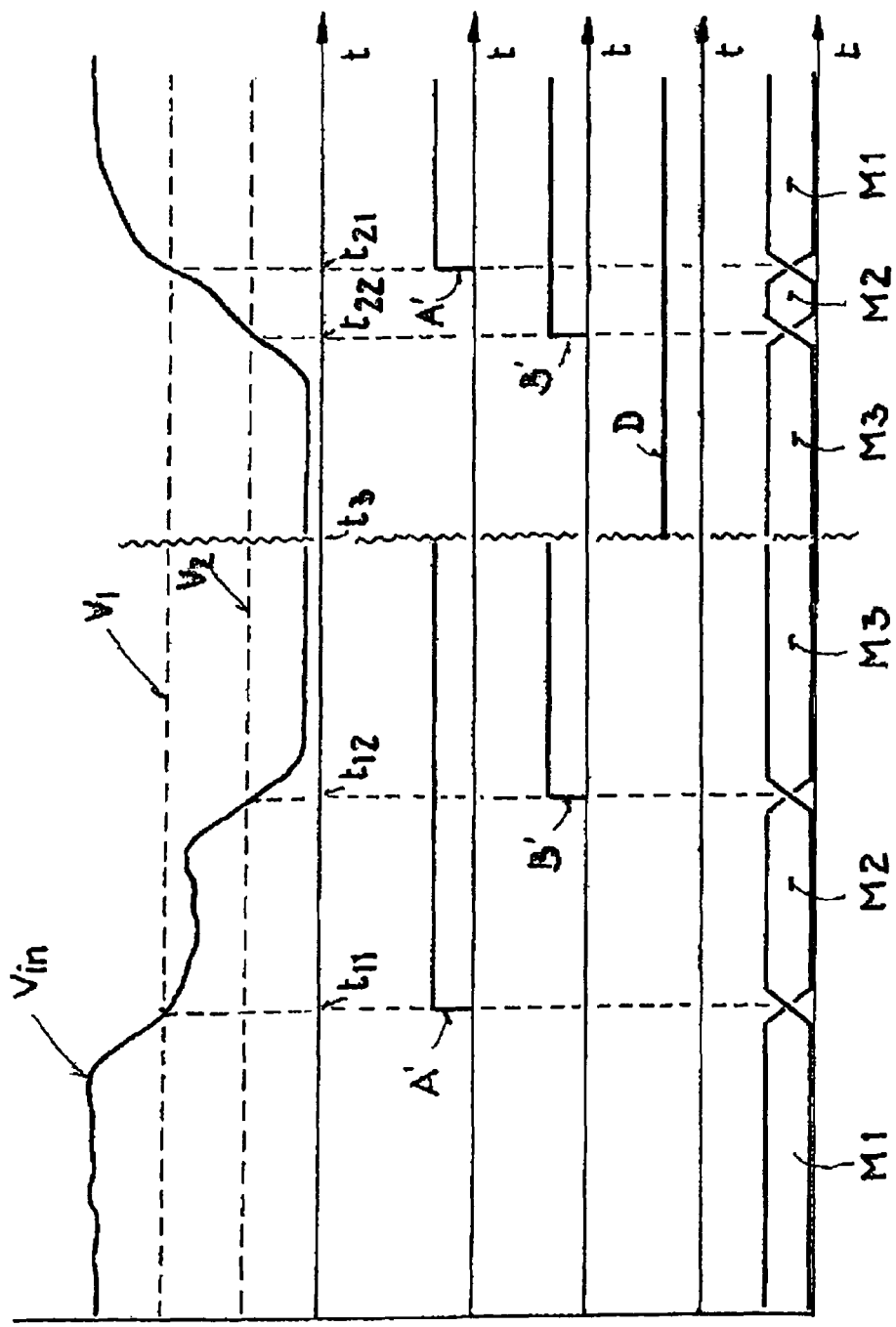
FIG. 2 shows a schematic diagram.

A diagram with a functionality of voltage monitoring for a transponder by means of several signal curves is shown schematically in FIG. 2. The quantities $V_{in}$, A', B', and D relate to the corresponding quantities in FIG. 1. Alternatively, however, a transponder circuit different from the one shown in FIG. 1 can also be used with a functionality shown in FIG. 2.

In the upper part of the diagram, the course of the input voltage $V_{in}$, to be compared, is shown in regard to a first threshold $V_1$ and a second threshold $V_2$. The time t is plotted on the abscissa in regard to all signals.

From the start of the plot to time $t_{11}$, the voltage $V_{in}$ is above the first threshold $V_1$. Arithmetic logic unit 10 in the associated first operating mode M1 processes a number of routines during the program run, whereby the routines have a different priority.

At time $t_{11}$, the voltage $V_{in}$ falls below the first threshold $V_1$. The signal A' changes from the low value to the high value. The positive edge of the signal A' triggers an interruption of the program run in arithmetic logic unit 10. Because of this interruption, arithmetic logic unit 10 changes to a second operating mode M2. The second operating mode M2 can also be called the low-power mode. In this second operating mode M2; a number of low-priority routines are stopped and a number of high-priority routines are continued. At least one low-priority routine is therefore stopped and at least one high-priority routine is continued.

High-priority routines are, for example, routines whose register values must be confirmed. These register values are needed to again load the stored register values in the register and to continue the program run after a voltage dip, when the capacitor voltage $V_{in}$ is again sufficient to continue the routines. This has the surprising effect that after a connection abort as well, a communication need not be totally performed anew, but continuation of the communication according to the state before the connection abort is enabled.

In contrast to high-priority routines, lower-priority routines are stopped. This has the surprising effect that the time interval in which reliable processing of program routines of the program run is possible is extended. This is achieved in that the capacitor voltage $V_C$ decreases more slowly also without a charging current $I_C$, i.e., without an alternating magnetic field. The error frequency is reduced. By prioritizing routines and stopping of lower-priority routines, the current drain from capacitor $C_{buf}$ by arithmetic logic unit 10 is surprisingly considerably reduced. In this way, the time interval between the two times $t_{11}$ and $t_{12}$ and therefore the duration of the operating mode M2 become longer.

At time $t_{12}$, the voltage $V_{in}$ falls below the second threshold $V_2$, so that the signal B' changes from a low value to a high value. The positive edge of signal B' again leads to an interruption of the program run. Arithmetic logic unit 10 switches to a third operating mode M3. This third operating mode M3 can also be called the sleep mode. The input voltage $V_{in}$ in the third operating mode M3 can decline so far that any operation can no longer be performed in arithmetic logic unit 10 or undefined states can arise in arithmetic logic unit 10. In this case, a reset can occur, so that all register values in arithmetic logic unit 10 are cleared. To be able to detect an increase in the input voltage $V_{in}$ also by positive edges, at time $t_3$ switchable inverter 12 is switched with signal D, so that signal A' is now inverted to signal A and so that signal B' is now inverted to signal B. Alternatively to the exemplary embodiment of FIGS. 1 and 2, failing edges of the signal A and B can also be employed to interrupt the program run in arithmetic logic unit 10.

If in the exemplary embodiment of FIG. 2, the input voltage $V_{in}$ at time $t_{22}$ rises above the second threshold $V_2$, high-priority routines are restarted in the now restarted second operating mode M2. In order to remove only a low current from the capacitor $C_{buf}$ due to the low input voltage $V_{in}$, however, low-priority routines are not started, so that the current uptake by arithmetic logic unit 10 is further reduced compared with the first operating mode M1.

At time $t_{21}$, the input voltage $V_{in}$ again rises above the first threshold $V_1$. Arithmetic logic unit 10 in operating mode M1 can then again start all high- and low-priority routines. The signal D in the first operating mode M1 is again set to a low value (not shown).

Figure 3:
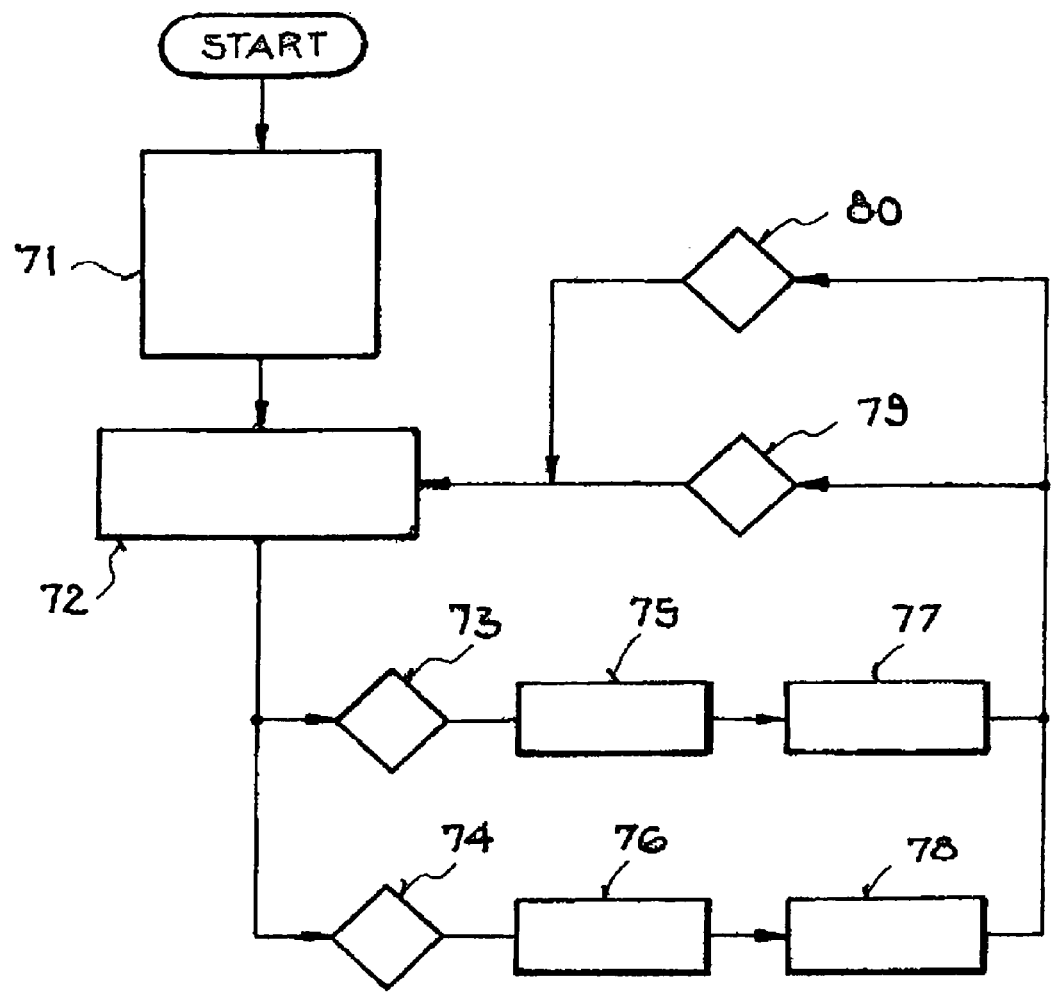
FIG. 3 shows a schematic process sequence.

FIG. 3 shows a simplified schematic flow diagram of a program run in arithmetic logic unit 10 with monitoring of the capacitor voltage $V_C$. After a start, in program part 71 the capacitor $C_{buf}$ is charged and the data input at the transponder is checked. Arithmetic logic unit 10 is reset and an initialization routine is started. At the start of the program run of arithmetic logic unit 10, the monitoring of capacitor voltage $V_C$ is begun. Next, in the program part 72 all higher- and lower-priority routines are started in a first operating mode. When a first threshold is underrun, a first interrupt signal 73 is generated and the program flow is interrupted. The fixed or dynamic address of the interrupt routine is loaded. The program flow is then continued in a second operating mode in program part 71.

If, in contrast, the second threshold is underrun, a second interrupt signal 74 is generated and the fixed or dynamic address of the interrupt routine is loaded. In program part 77, arithmetic logic unit 10 is placed in a third operating mode, a sleep mode. In the third operating mode, after the last commands are processed, all routines can be suspended to continue these when the voltage supply is restored.

By means of interrupt signal 79, which is assigned to overwriting of the first threshold, or by interrupt signal 80, which is assigned to overwriting of the second threshold, the program flow again reaches program part 72, with the execution of higher-priority routines and lower-priority routines.

The invention is thereby not limited to the exemplary embodiment of a process course according to FIG. 3. Thus, other program flows, which nevertheless have the monitoring function of the two thresholds for the three operating modes, can be easily derived by the person skilled in the art. For example, the four interrupt signals can also be assigned dynamically four different and variable thresholds depending on the address within the program flow. It is also possible to provide other thresholds beyond the two thresholds in order to control, for example, the current drain by the arithmetic logic unit in several increments.

LIST OF REFERENCE CHARACTERS 10 arithmetic logic unit
12 switchable inverter
20 transmit-receive circuit
21 battery
30 voltage regulator
31 switch
40 comparator circuit, comparator
41 multiplexer of the comparator circuit
50 control circuit for the switch
60 reset logic
61 OR gate
71, 72, 75, 76, 77, 78 part of a program run
73, 74, 79, 80 interrupt signal (IRQ)
100 base station
120 transponder connection, air interface
$L_t$ coil of the transmit-receive circuit
$C_{buf}$ capacitor, power storage
$V_{bat}$ battery voltage
$V_C$ capacitor voltage
$V_1$ first threshold
$V_2$ second threshold
$V_{in}$ input voltage of the comparator circuit
$I_C$ charging current
$I_D$ discharge current
Vdd supply voltage/supply voltage input
A, B output signal of the comparator circuit
A', B' output signal of the comparator circuit after the switchable inverter
D control signal
M1, M2, M3 operating mode
$t_{11}, t_{12}, t_3, t_{22}, t_{21}$ time

The invention claimed is:

1. A method comprising:
comparing a capacitor voltage of a capacitor of a transponder, the capacitor for storing power transmitted via an air interface, with a threshold voltage, the transponder having an arithmetic logic unit configured to be supplied with the at least a portion of the stored power;
determining, at a first time and in response to determining that the capacitor voltage of the capacitor exceeds the threshold, to operate in a first operating mode, the first operating mode comprising performing a number of routines having different associated priorities;
updating a status register of the arithmetic logic unit with an indicator of the determined first operating mode;
determining, at a second time and in response to determining that the capacitor voltage of the capacitor is below the threshold, to operate in a second operating mode, the second operating mode suspending at least one low-priority routine at a place within a run of the at least one low-priority routine and continuing at least one higher-priority routine;
updating a status register of the arithmetic logic unit with an indicator of the second operating mode; and
resuming, in response to determining at a third time that the capacitor voltage of the capacitor exceeds the threshold, the at least one previously-suspended low-priority routine from the place within the run at which the at least one previously-suspended low-priority routine was suspended.

2. The method of claim 1, wherein suspending the at least one low-priority routine comprises stopping the at least one low-priority routine.

3. The method of claim 1, wherein suspending the at least one low-priority routine comprises storing register values of the at least one low-priority routine in a non-volatile memory.

4. The method of claim 1, further comprising, in response to an interrupt signal, interrupting a program run in the arithmetic logic unit, the interrupt signal being generated based on the comparison of the capacitor voltage with the threshold voltage.

5. The method of claim 1, wherein the at least one higher-priority routine comprises a routine whose register values must be stored.

6. A transponder comprising:
a capacitor configured to store power transmitted via an air interface;
a comparator configured to:
compare a capacitor voltage of the capacitor with a threshold voltage;
and
an arithmetic logic unit supplied with the stored power from the capacitor, the arithmetic logic unit configured to:
determine, at a first time and in response to determining that the capacitor voltage of the capacitor exceeds the threshold, to operate in a first operating mode, the first operating mode comprising performing a number of routines having different associated priorities;
update a status register of the arithmetic logic unit with an indicator of the determined first operating mode;
determine, at a second time and in response to determining that the capacitor voltage of the capacitor is below the threshold, to operate in a second operating mode, the second operating mode comprising suspending at least one low-priority routine at a place within a run of the at least one low-priority routine and continuing at least one higher-priority routine;
update a status register of the arithmetic logic unit with an indicator of the second operating mode; and
resume, in response to determining at a third time that the capacitor voltage of the capacitor exceeds the threshold, the at least one previously-suspended low-priority routine from the place within the run at which the at least one previously-suspended low-priority routine was suspended.

7. The transponder of claim 6, wherein to suspend the at least one low-priority routine, the arithmetic logic unit is further configured to stop the at least one low-priority routine.

8. The transponder of claim 6, wherein to suspend the at least one low-priority routine, the arithmetic logic unit is further configured to store register values of the at least one low-priority routine in a non-volatile memory.

9. The transponder of claim 6, wherein the arithmetic logic unit is further configured to, in response to an interrupt signal, interrupt a program run in the arithmetic logic unit, the interrupt signal being generated based on the comparison of the capacitor voltage with the threshold voltage.

10. The transponder of claim 6, wherein the at least one higher-priority routine comprises a routine whose register values must be stored.

11. One or more non-transitory computer-readable storage media embodying logic that is operable when executed to:
    receive a comparison of a capacitor voltage of a capacitor with a threshold voltage, the capacitor storing power transmitted via an air interface;
    determine, at a first time and in response to determining that the capacitor voltage of the capacitor exceeds the threshold, to operate in a first operating mode, the first operating mode comprising performing a number of routines having different associated priorities;
    update a status register of an arithmetic logic unit with an indicator of the determined first operating mode;
    determine, at a second time and in response to determining that the capacitor voltage of the capacitor is below the threshold, to operate in a second operating mode, the second operating mode comprising suspending at least one low-priority routine at a place within a run of the at least one low-priority routine and continuing at least one higher-priority routine;
    update a status register of the arithmetic logic unit with an indicator of the second operating mode; and
    resume, in response to determining at a third time that the capacitor voltage of the capacitor exceeds the threshold, the at least one previously suspended low-priority routine from the place within the run at which the at least one previously-suspended low-priority routine was suspended.

12. The media of claim 11, wherein to suspend the at least one low-priority routine, the logic is further operable when executed to stop the at least one low-priority routine.

13. The media of claim 11, wherein to suspend the at least one low-priority routine, the logic is further operable when executed to store register values of the at least one low-priority routine in a non-volatile memory.

14. The media of claim 11, wherein the at least one higher-priority routine comprises a routine whose register values must be stored.

\* \* \* \* \*